(No Model.) 6 Sheets—Sheet 1.

F. H. RICHARDS.
WEIGHING MACHINE.

No. 559,212. Patented Apr. 28, 1896.

Fig. 1.

Witnesses:
R. W. Pittman
Fred. J. Dole

Inventor:
F. H. Richards (No Model.) 6 Sheets—Sheet 3.

F. H. RICHARDS.
WEIGHING MACHINE.

No. 559,212. Patented Apr. 28, 1896.

Fig. 3.

Witnesses:
R. W. Pittman
Fred. J. Dole.

Inventor:
F. H. Richards.

(No Model.)

F. H. RICHARDS.
WEIGHING MACHINE.

No. 559,212.  Patented Apr. 28, 1896.

Fig.5.

Witnesses:
R. W. Pittman
Fred. J. Dole.

Inventor:
F H Richards

(No Model.)  
F. H. RICHARDS.  
WEIGHING MACHINE.

No. 559,212. Patented Apr. 28, 1896.

Witnesses:  
R. W. Pittman  
Fred. J. Dole

Inventor:  
F. H. Richards

UNITED STATES PATENT OFFICE.

FRANCIS H. RICHARDS, OF HARTFORD, CONNECTICUT.

WEIGHING-MACHINE.

SPECIFICATION forming part of Letters Patent No. 559,212, dated April 28, 1896.

Application filed August 7, 1895. Serial No. 558,492. (No model.)

*To all whom it may concern:*

Be it known that I, FRANCIS H. RICHARDS, a citizen of the United States, residing at Hartford, in the county of Hartford and State of Connecticut, have invented certain new and useful Improvements in Weighing-Machines, of which the following is a specification.

This invention relates to weighing-machines for weighing and delivering fluids, the object being to provide an effective organization of coacting mechanisms and devices embodying a fluid-chamber provided with a conduit or conduits, a stream-controlling valve or valves operative in the conduit or conduits for controlling the supply of fluid to the bucket, a bucket-discharge valve or valves for controlling the discharge of the bucket-load, and means for limiting the opening movement of the bucket-discharge valve or valves by the non-closing of the stream-controlling valve or valves, and vice versa, whereby that reliability and accuracy of operation which are necessary to a practically-successful fluid-weighing machine will be positively insured.

In the drawings accompanying and forming a part of this application.

Similar characters designate like parts in all the figures of the drawings.

For convenience in illustrating the nature and purpose of the present improvements these are shown applied to a weighing-machine of a type substantially similar to that shown and described in my concurrently-pending application, Serial No. 541,087, filed March 9, 1895.

The framework for carrying the operative parts of the machine may be of any suitable construction, and is shown comprising two side frames or uprights 2 and 4, mounted upon a chambered supporting-base 3 and connected by a top plate 5, which is shown carrying a suitable fluid-chamber, such as H, which may be secured to the top plate 5 in any well-known manner. The base 3 is shown carrying suitable beam-supports, such as the V-shaped bearings 20 and 20', for supporting the beam mechanism, which will carry the bucket mechanism, consisting of the bucket and its operative devices.

As a means for supporting the bucket or load carrying receptacle, (designated in a general way by G,) I prefer to employ the beam mechanism shown, which consists of a pair of oppositely-disposed counterweighted beams B and B', respectively, pivotally mounted upon beam-supports—as, for instance, by means of a pair of pivots or knife-edges, one of which is shown at 24, and an oppositely-disposed pair of pivots or knife-edges 24'. The beam mechanism is also shown provided with bucket-supports located intermediate of said beam-supports, and these are shown in the drawings comprising two remotely-disposed pairs of pivots or knife-edges 15 and 17, but one of said pair of knife-edges 15 being shown.

The bucket G is shown provided with a pair of hangers 555, one on each end thereof, which will be suitably secured to the bucket G, and which hangers are shown carrying V-shaped bearings 16, corresponding in number and position with the knife-edges 15 and 17, and on which the V-shaped bearings will be supported.

The bucket G is of the well-known "single-chambered" type or class, and will be suspended with its receiving opening or mouth to receive the stream or streams of material from the fluid-chamber H, and will preferably be lined with some acid-proof material, as will all the parts which come into contact with the fluid.

As a means for controlling the discharge of the bucket-load, one or more bucket-discharge valves may be employed, and there is shown in the drawings a series of three of these bucket-discharge valves, (designated, respectively, $60^a$, $60^b$, and $60^c$,) and these valves will be hereinafter indiscriminately referred to as the "bucket-discharge" valve or valves 60. The bucket is shown provided approximately near its lower end with an exterior casing 61, which may be secured thereto in some suitable manner, and which constitutes a fluid-chamber at the discharge end of the bucket. The casing 61 is shown provided with one or more conduits, three in number, (designated, respectively, $62^a$, $62^b$, and $62^c$,) which will hereinafter be indiscriminately referred to as the "bucket-discharge" conduit or conduits 62. The conduits will be tubular and preferably cylindrical or circular in cross-section. The bucket-discharge valves 60 are shown operative in these bucket-discharge conduits 62, each for controlling the outflow of a discharge stream, and will have a simultaneous intermittently-reciprocatory sliding movement for alternately closing and opening the discharge outlets or ports, hereinafter described. The bucket-discharge valves 60 are shown as piston-valves, and will preferably be hollow or chambered for lightness, and will also be provided with packing-rings, which will serve their well-known function. The bucket-discharge conduits are shown provided each with a series of openings, (designated, respectively, by $62'$ and $62''$,) and which may be of any number, which openings constitute outlets or outlet or discharge ports, and the sliding bucket-discharge valves 62 will be operative for controlling these outlet openings or ports $62'$ and $62''$. These openings may be formed in some well-known manner, and will preferably be inclined to better permit a free, unimpeded sliding movement of the bucket-discharge valves 60 in their respective conduits 62.

The upper faces of the bucket-discharge valves 60 will preferably also be inclined, and the inclination is shown substantially coincident with the inclination of the outlets or outlet-ports $62'$ and $62''$, and it will be obvious that on the ascending and descending movements of the valves in their respective conduits no abutments or angles will be offered either by the valve to the conduit, or vice versa, so that, as hereinbefore stated, a perfectly free and unimpeded sliding movement of the valves will be insured. The bucket-discharge valves 60 are preferably hollow or chambered and are normally held against opening or discharge movement and are adapted, when released by reason of the pressure of the valve-sustained fluid, to be quickly opened, each for discharging a stream of fluid, and hence the bucket-load.

As a means for carrying the bucket-discharge valves 60, a rock-shaft is shown extending transversely of the bucket. The rock-shaft is shown at 63 and will be suitably journaled in bearings formed in or on the end walls of the bucket. This rock-shaft will be normally held against rotative or rocking movement by holding means which will be hereinafter described.

The bucket-discharge valves will be carried by the rock-shaft 63 by links or other suitable connection connected with a like number of rocker-arms on the rock-shaft. The outer extremity or end of the rock-shaft 63 is shown provided with a crank-arm $63'$, which is shown constituting the means for operatively connecting the bucket-discharge valves 60 with an inverted toggle connection which supports the rock-shaft 63, which latter carries the bucket-discharge valves 60, and hence this inverted toggle connection is shown constituting a means for supporting the bucket-discharge valves 60. This toggle connection is so positioned as to be engaged by a latch or other holding means, which will normally hold the bucket-discharge valves 60 against opening movement. In the form thereof shown the toggle connection comprises a rocker 550, pivoted adjacent to the upper rearward side of the bucket and having a long connecting-rod 596, pivoted to said rocker and also to the connecting-link $63'$ in such a manner that when the valve or valves 62 are closed (see Fig. 2) the two pivots of said connecting-rod 596 will be nearly in line with and the upper of said pivots will be above the rocker-pivot, whereby when the rocker is engaged by the latch 82 and held in that position the shaft 63, and hence the valve 60, will be supported with a minimum pressure on said latch, as practically all the weight of the bucket-contents will be carried on the pivot $550''$ of the rocker.

The pivot or center of movement $550''$ of the rocker is shown constituting a rock-shaft extending from end to end of the bucket and suitably journaled in bearings formed on the bucket. The rock-shaft $550''$ at the end opposite to that having the rocker 550 is shown provided with a second connecting-rod $596'$, connected thereto by a crank-arm, the other end of which will be operatively connected with the rock-shaft 63, which carries the bucket-discharge valves 60.

The latch for locking the rocker 550 in position is shown at 82, pivoted at 87 to the bucket G. The latch 82 is also shown provided with a detent or stop 81 in position and adapted for engaging a coöperating detent or stop 550', carried by the rocker 550 when the parts are in the position shown in Fig. 2, and with the valves 60 closed. The latch 82 is shown counterweighted, and will be limited in its movement toward the detent or stop 550' of the rocker 550 by suitable stops. It will be noticed that in the embodiment thereof illustrated in the present case the latch 82 swings upward to engage the detent 550' of the rocker 550, and hence it will be evident that said latch will be released from engagement with the rocker-detent by a downward pressure for releasing the valve 60.

The lower or discharge end of the bucket G, it will be remembered, has been described as provided with a casing 61, which is shown having a bucket-discharge conduit or conduits 62, in which the bucket-discharge valve or valves 60 are operative. A second casing is shown at 64, and this second casing 64 may be secured to the first-mentioned casing, as shown by the drawings, or to the bucket, and will preferably entirely surround the same. The lower edge of the casing 64 is shown in a plane substantially coinciding with that of the lower edge of the discharge-conduits 62, and this casing constitutes a scatter-guard for preventing scattering and waste of a fluid when discharged by the bucket, and also as a convenient means for directing any scattered fluid to a receiving-receptacle.

The top plate, as hereinbefore stated, is shown carrying a fluid-chamber or fluid-containing chamber H. The chamber will be provided in its upper face with a supply-opening, which is intended to receive a supply-pipe S, which latter receives the fluid from some source of supply and conducts and directs it to the fluid-chamber H. The supply-pipe will preferably be connected to the fluid-chamber by some fluid-tight joint.

As a means for controlling the supply-stream from the supply-pipe S, or a stream or streams from the fluid-chamber H, a stream-controlling valve or valves will be provided. A series of four of these stream-controlling valves is shown, (designated, respectively, by $70^a$, $70^b$, $70^c$, and $70^d$,) and the valve $70^d$ is shown constituting a drip-valve, and the valves $70^a$, $70^b$, and $70^c$ are shown as reducing-valves. These valves $70^a$, $70^b$, $70^c$, and $70^d$ will be hereinafter indiscriminately referred to as the "stream-controlling" valve or valves 70. Like the bucket-discharge valves, I prefer to make the stream-controlling valves 70 hollow or chambered, and they may be of the ordinary form of piston-valve, such as herein shown.

Figures 7, 9:
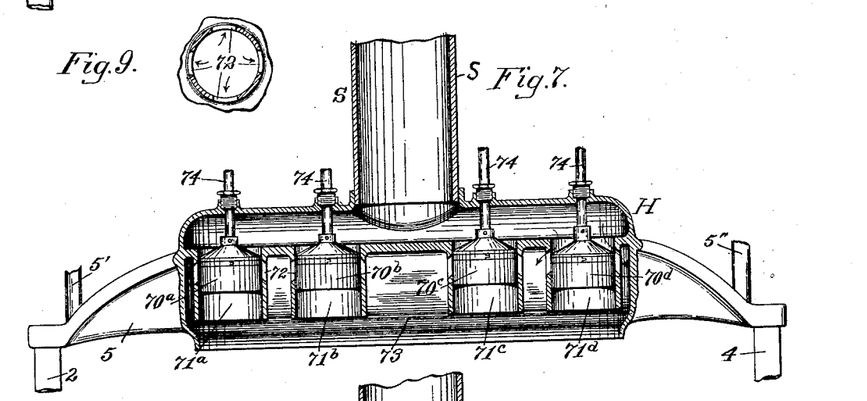
Figs. 7 and 8 are similar views showing, respectively, the stream-controlling valves in the drip and the "cut-off" positions.
Fig. 9 is a detail view of a stream-supply conduit, partially in cross-section, showing a series of supply-ports through which the stream flows into the bucket.
Figure 8:
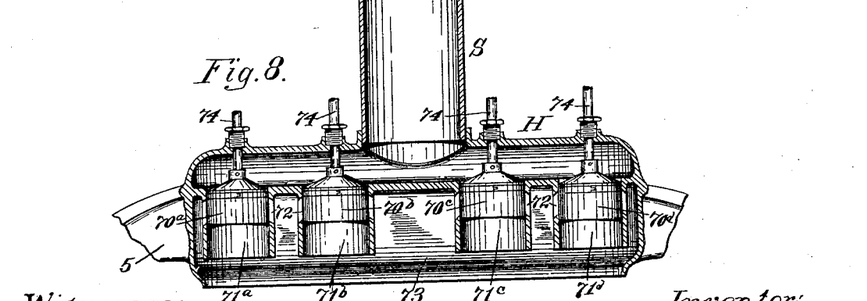

The chamber H is shown on its under side provided with a series of supply-conduits (designated, respectively, by $71^a$, $71^b$, $71^c$, and $71^d$,) which will be hereinafter indiscriminately referred to as the "supply-conduit" or "supply-stream" conduits 71. These conduits, as shown, will preferably be cylindrical or circular in cross-section. The conduits 71 will each be provided with a series of openings constituting supply openings or ports, (see Fig. 9,) and these supply-ports are designated, respectively, by 72 in each case. The stream-controlling valves will each be operative in its respective conduit and will have a reciprocative sliding movement for intermittently opening and closing the supply ports or openings to permit and to cut off the flow of fluid into the bucket. While the stream-controlling valves permit the flow of the fluid into the bucket, the bucket-discharge valves 60 are effective for preventing the outflow of the fluid, and while the bucket-discharge valves 60 permit the outflow of the fluid from the bucket the stream-controlling valves will be effective to prevent the inflow of the fluid into the bucket. Hence it will be evident that the stream-controlling and the bucket-discharge valves are intermittently effective, and that the effective periods thereof are non-synchronous.

The top plate 5 is shown provided with a pair of upwardly-extending risers or arms 5' and 5", in which will be formed bearings. A rock-shaft is shown at 71''' extending transversely of the machine, and its ends are shown journaled for rocking or rotative movement in the arms 5' and 5" of the top plate 5. The shaft 71''' is shown constituting the means for carrying the stream-controlling valves 70, and hence it will be evident that the valve movements may be regulated by means controlling or regulating the movements of said shaft 71'''.

The supply-openings or supply-ports 72 of the supply-conduits 71 will preferably, like the outlet-openings in the discharge-conduits, be inclined, and the upper faces of the stream-controlling valves 70 will also be inclined and in a plane substantially coincident with that of the supply-openings, for the purpose hereinbefore described.

The fluid-chamber H is shown provided with a downwardly-extending flange 73, which extends below the plane of the lower edge of the supply-conduits, and which constitutes a scatter-guard for preventing waste of the fluid after this leaves the fluid-chamber H, and also as a convenient means for directing any scattered fluid into the bucket G.

Each of the stream-controlling valves will be supported by suitable means and will be operable from the valve-carrying rock-shaft 71'''. Each of said valves is shown provided with a valve stem or rod 74, which will work in a suitable screw or other bearing fitted in openings located above and centrally of each of the supply-conduits 71'''.

The valve-stems of the stream-controlling valves will be operatively connected with the rock-shaft 71''', and there is shown secured to said shaft for movement therewith a series of hubs 75, each of which will have formed thereon a rocker-arm 75', which is shown connected with a pair of links 76, pivoted, respectively, to the arm 75 and to the valve-stems. The valve-stem for the drip-valve 70ᵈ will preferably be longer than that of the reducing-valves 70ᵃ, 70ᵇ, and 70ᶜ, so that when the latter have cut off the respective streams controlled thereby the drip-valve 70ᵈ will be effective for permitting a continued flow through the supply-ports 72 of the conduit 71ᵈ of a relatively small or drip stream, which is generally necessary to complete a partial bucket-load. Hence it will be evident that two or more valves will be provided, one of which will have an effective cut-off movement succeeding that of the others, and it will be also evident that these valves will be operative on a common center of movement.

Suitable valve opening and closing mechanism will be employed, and the valve-closing mechanism shown will now be described. It will be apparent that when the valve-carrying rock-shaft 71‴ is rotated in one direction the valves 70 will, through the agency of the described connections, be raised for cutting off the supply-stream, through the closing of the supply-ports 72 by said valves 70, and that when the rock-shaft 71‴ is rotated in an opposite direction the valves will be opened or the supply-ports 72 will be unclosed to permit a flow of a stream or streams of the fluid into the bucket. The rock-shaft 71‴ is shown provided with a rearwardly-extending arm 77, which is illustrated carrying a counterweight 78 of relatively considerable size, and which counterweight 78 constitutes the means for closing the stream-controlling valves 70 or a valve-closing actuator.

The machine will have the usual poising and counterpoising portions, and all those parts of the beam mechanism lying or located outside of the beam-supports constitute the counterpoising portion of the machine and all those parts lying or located inside of said V-shaped bearings, including the bucket, constitute the poising portion of the machine.

The valve-shaft 71‴ is shown provided with a rearwardly-extending arm 558', and there is shown, pivotally-connected to the outer extremity of this arm 558', a connecting rod or arm 558. The lower end of this rod is in position and adapted to be engaged by a valve-opening actuator, which will now be described.

The connecting-rod 558 is illustrated constituting the means for transmitting to the stream-controlling valves 70, through the valve-shaft 71‴, the valve-opening movement or thrust of a valve-opening actuator. This valve-opening actuator is shown consisting of a lever 551 pivoted to the scale-beam B at 551' and counterweighted at its rear end. It will be noticed that the pivot 551' of this valve-opening actuator is shown located between the bucket-supports, so that any downward pressure exerted upon the inner end of said actuator will oscillate the same; and that a very slight oscillatory movement will be necessary to shift the weight thereof from the counterpoising to the poising portion of the machine.

The connecting-rod 558 has been described as having its lower end in position and adapted to be engaged by a valve-opening actuator, and it will be evident that the lever 551 constitutes the valve-opening actuator for engaging said rod. When free for actuating the valves to open the same, this rod 558 forms a part of the valve-opening actuator; but when the opening of the valve is prevented, on the descent of the bucket, it will also be evident that this rod 558 forms a stop device for limiting or checking the valve-opening movement of the valve-opening actuator 551.

Means will be provided for limiting the opening movement of the bucket-discharge valve or valves by the non-closing of the stream-controlling valve or valves and for limiting the opening movement of the stream-controlling valve or valves by the non-closing of the bucket-discharge valve or valves, and the means shown will now be described.

Figure 4:
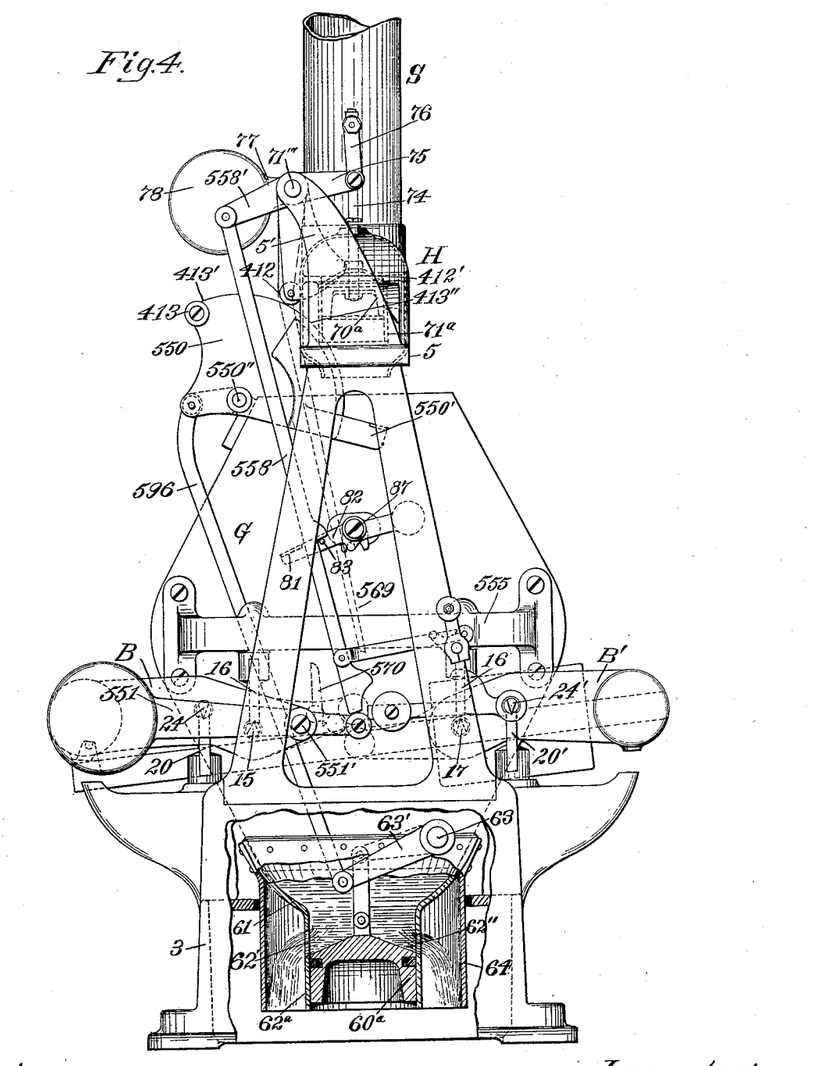
Fig. 4 is a view similar to Figs. 2 and 3, showing the stream-controlling valves in the cut-off positions thereof and the bucket-discharge valves open for discharging the bucket-load.
Figure 5:
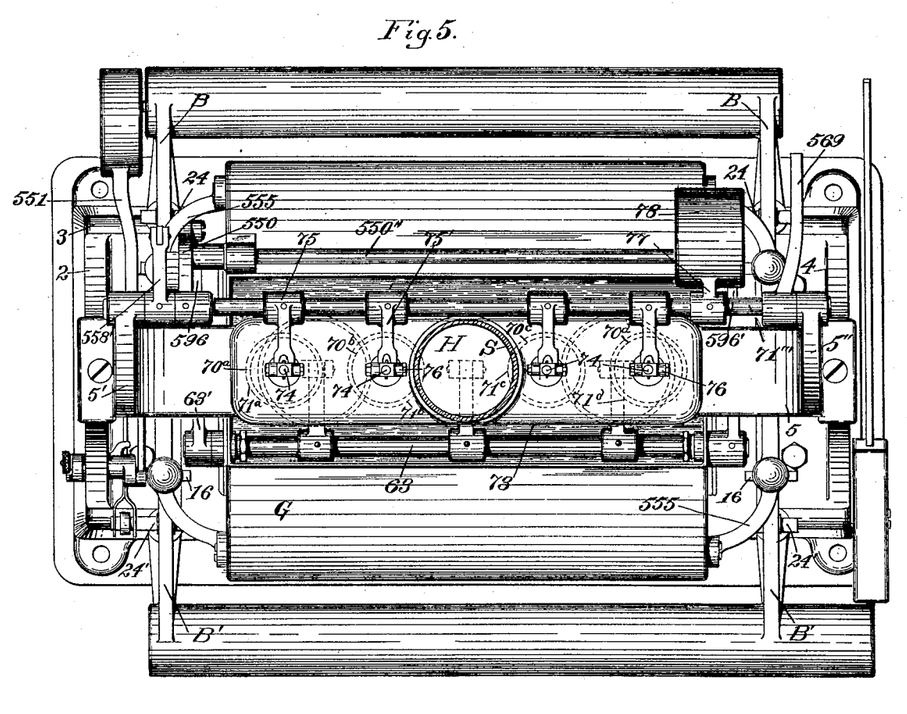
Fig. 5 is a plan view of the machine.
Figure 6:
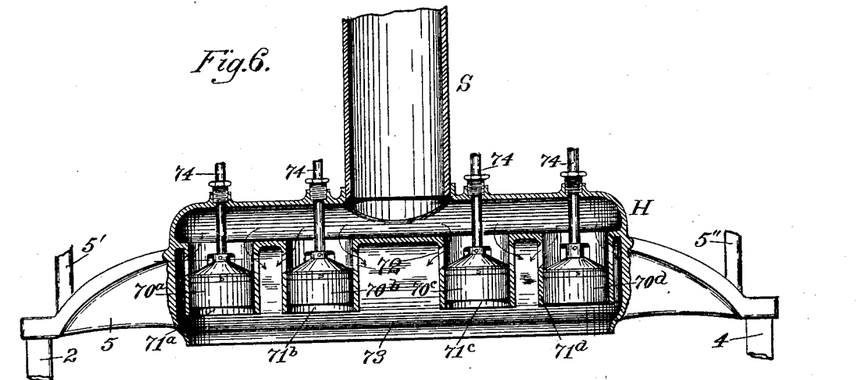
Fig. 6 is a detail view, partly in transverse section, illustrating the top plate of the framework of the machine for supporting the fluid-chamber, also showing the stream-controlling valves in position for permitting the flow of the full supply into the bucket.

A pair of coacting stops are shown, one of which is illustrated at 412', operative with the stream-controlling valve or valves, and the other at 413, operative with the bucket-discharge valve or valves, and in such position that each is adapted to serve as a stop device for the other while the stream-controlling valves are open, (see Fig. 2,) and a second pair of stops are shown, one of which is illustrated at 412, operative with the stream-controlling valve or valves, and the other of which is illustrated at 550, operative with the bucket-discharge valve or valves, and in such position that each serves as a stop device for the other when the bucket-discharge valve or valves are open. (See Fig. 4.) The bucket-discharge-valve stop 550 is also shown provided with a stop-face 413', preferably cam-shaped, and adapted to actuate the stream-controlling valve-stop 412 at the end of the normal cut-off movement of the drip-valve 70ᵈ for the purpose of imparting an additional closing movement to said valve. The bucket-discharge-valve stop-face 413' also has, preferably, an ascending movement with the bucket, which will impart a further closing movement to the drip-valve 70ᵈ. These stops will preferably be oscillatory relatively to each other, and the stop-face 412' will preferably be cam-shaped and so positioned to compensate for the downward movement of the bucket while the stream-controlling valve or valves are open.

The rocker 550 is shown constituting the bucket-discharge-valve stop for coacting with the stream-controlling valve-operative stop 412 while the bucket-discharge valve or valves are open, and said rocker is shown having secured thereto a valve-stop 413 in the form of a friction-roller, and also having supplementary stop-faces 413' and 413″, the former of which is illustrated defined by an arc departing from and within the arc defining the face 413″, and which arc is struck from the center of movement of the rocker 550". The stream-controlling valves 70 are also shown having a stop 412, illustrated as a friction-roller, and a supplementary stop-face 413', shown as a cam-face defined by an arc approaching an arc struck from the axis of the stream-controlling valves, and which arc intersects the curve of the cam-face at that end of said cam-face which is relatively remote from the friction-roller 412.

The two described stop-faces, operative with the stream-controlling-valve mechanism coöperate with the stop-faces carried by the rocker to limit or check the opening movement of the stream-controlling valves when the bucket-discharge valve or valves are released, and the stop-faces 413 and 412' form a means for preventing the opening movement of the stream-controlling valve or valves while the bucket-discharge valve or valves are open by limiting or checking the opening movement of the bucket-discharge valves if the latch 82 is released during the period while the stream-controlling valve or valves are open, and the stop-faces 412, 413', and 413" coöperating to form the other means for preventing the opening movement of the stream-controlling valve or valves when the bucket-discharge valve or valves are released during the period in which said stream-controlling valves are closed by reciprocally limiting the movements of the valve-carrying shafts.

It will be remembered that one of the stream-controlling valves has been described having a cut-off movement succeeding that of the others for the purpose of permitting the continued flow of a drip-stream, which is generally necessary to complete a partial bucket-load. As a means for controlling the duration of the drip-stream the valve-shaft 71''' is shown provided with a long depending stop arm or lever 569, oscillatory with said shaft and in position and adapted to be engaged by a stop on the poising portion of the machine at a predetermined point in the oscillation of the valve-shaft for closing the valves. A by-pass stop is shown at 570, pivotally carried by the scale-beam B and having its upper end adapted to swing toward the rear and having its forward movement limited by means of a stop 570", also shown carried by the scale-beam B. The depending stop-arm 569 is preferably movable in unison and coöperative with the drip-valve 70$^d$, so that when the remaining valves or reducing-valves have each cut off their respective stream or streams the stop 570 will be effective for holding the valve 70$^d$ against further closing movement until, when the bucket-load is complete, the arm 569 will be released and the valve 70$^d$ closed by the valve-closing actuator 78.

The length of the upper arm of the by-pass stop 570 is such relatively to the depending rod or arm 569 that when the drip-valve 70$^d$ is stopped in its closing movement at the beginning of the poising or drip-stream period the latch 570 will not release said lever 569 until the bucket has reached and gone below the poising-line on the completion of the bucket-load. This stop 570 will be provided with a counterweight, and by reason of its pivotal support will permit the return movement of the lever 569 on the return of the bucket and also permit the opening movement of the stream-controlling valves 70.

When the bucket has come very near to the close of the poising period, it is important to instantly bring about the release of the bucket-discharge valve or valves to permit a discharge of the bucket-load. Means have been described for holding the bucket-discharge valves 60 against opening movement, which means embody a latch 82; and it will be obvious that when said latch 82 is released the bucket-discharge valve or valves 60 will also be released to discharge the bucket-load.

The valve-shaft 71''' is shown operative with the valves 70, and hence forms a part of the valve mechanism, and will be provided with a latch-actuator or bucket-discharge valve-releaser, which will be effective for releasing the bucket-discharge valves 60 on the final cut-off movement of the stream-controlling valves 70.

The latch 82 is shown provided with a laterally-projecting stop or arm 83 in position and adapted to be engaged by a releaser device or latch-actuator. The connecting-rod 556 is shown provided with a latch-actuator or releaser device in such position and adapted when the bucket has nearly reached the close of the poising period to be brought into contact with the stop 83 on the latch 82 to thereby release the latch 82 from engagement with said rocker 550. On the release of the rocker 550 the bucket-discharge valve or valves 60 will be free to open, and immediately when so freed or released the pressure of the fluid supported by the valves will be such as to quickly open said valves 60 to discharge the bucket-load.

Figure 1:
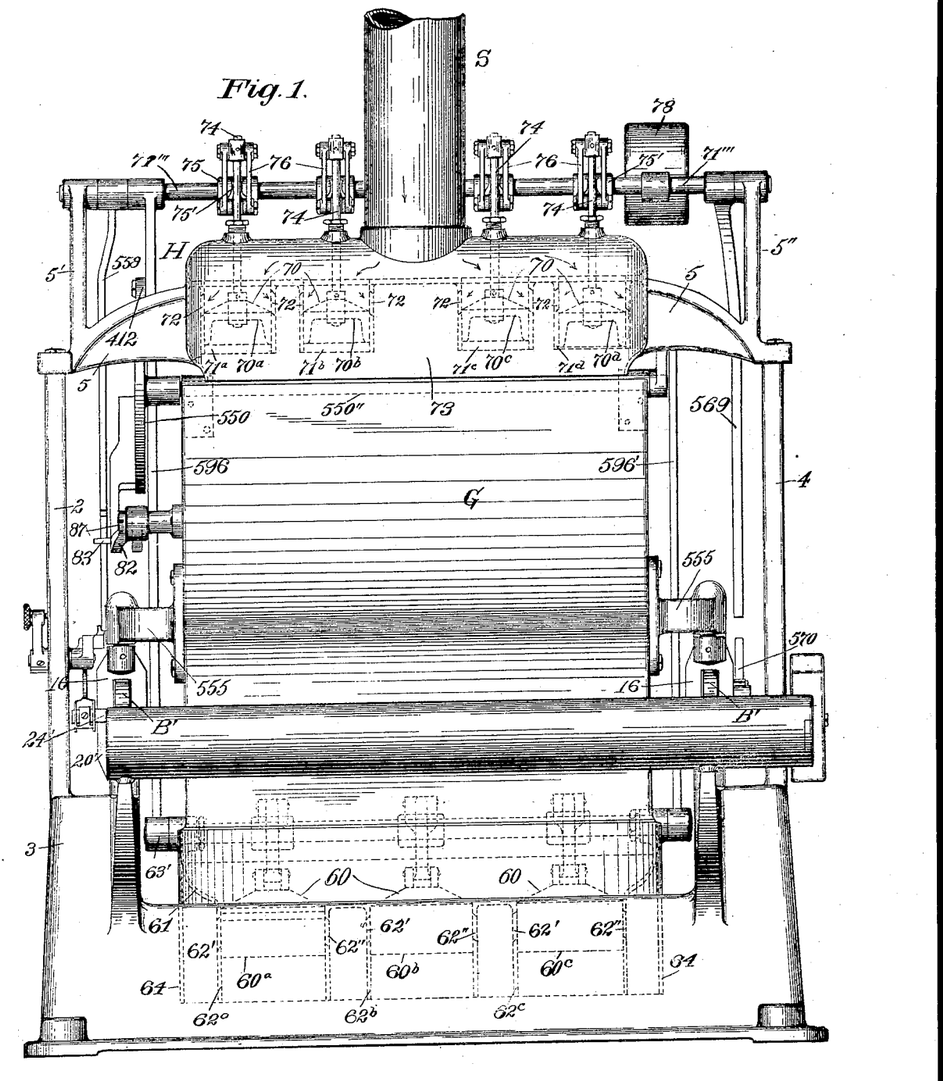
Figure 1 is a front elevation of a weighing-machine embodying the present improvements, a series of stream-controlling valves being shown by dotted lines in a position for permitting the flow of the supply-stream from the fluid-chamber into the bucket, and a series of bucket-discharge valves being also shown by dotted lines in the closed positions thereof.
Figure 2:
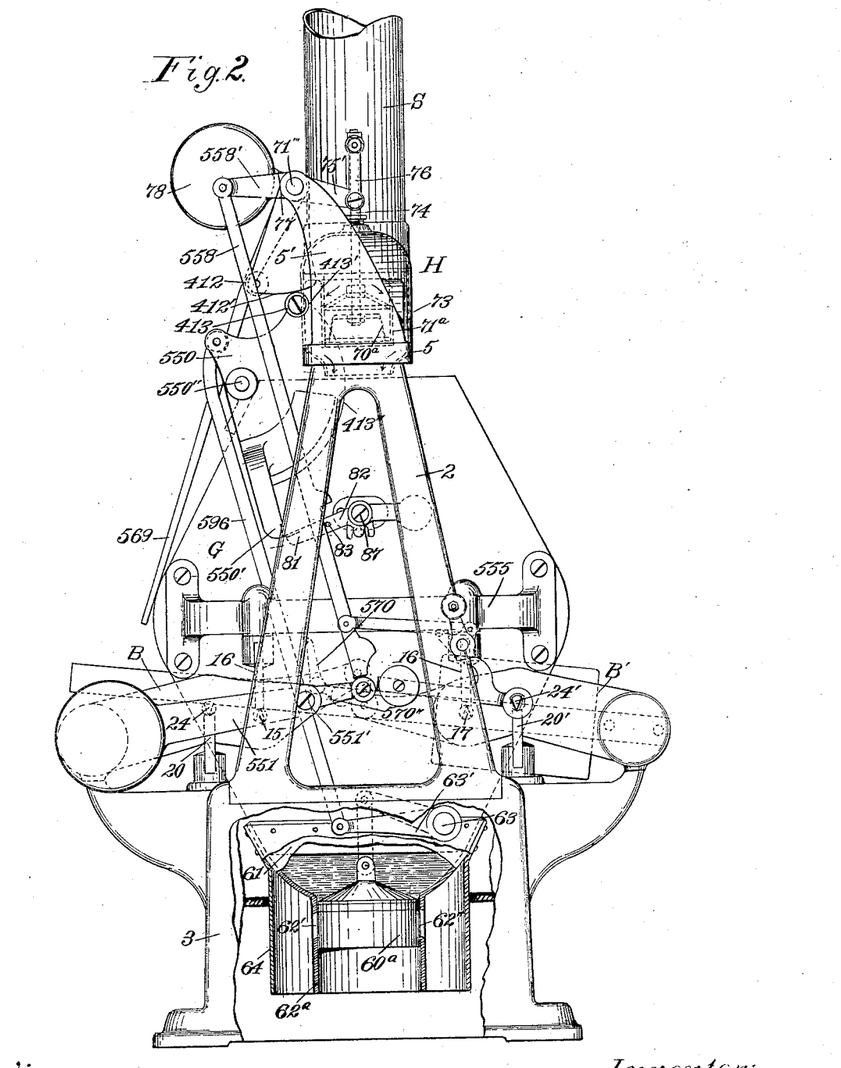
Fig. 2 is an end elevation of the machine seen from the left in Fig. 1, showing the parts in substantially the same positions these are shown occupying in Fig. 1 and also showing mechanism for actuating and limiting the movements of the stream-controlling and bucket-discharge valves.
Figure 3:
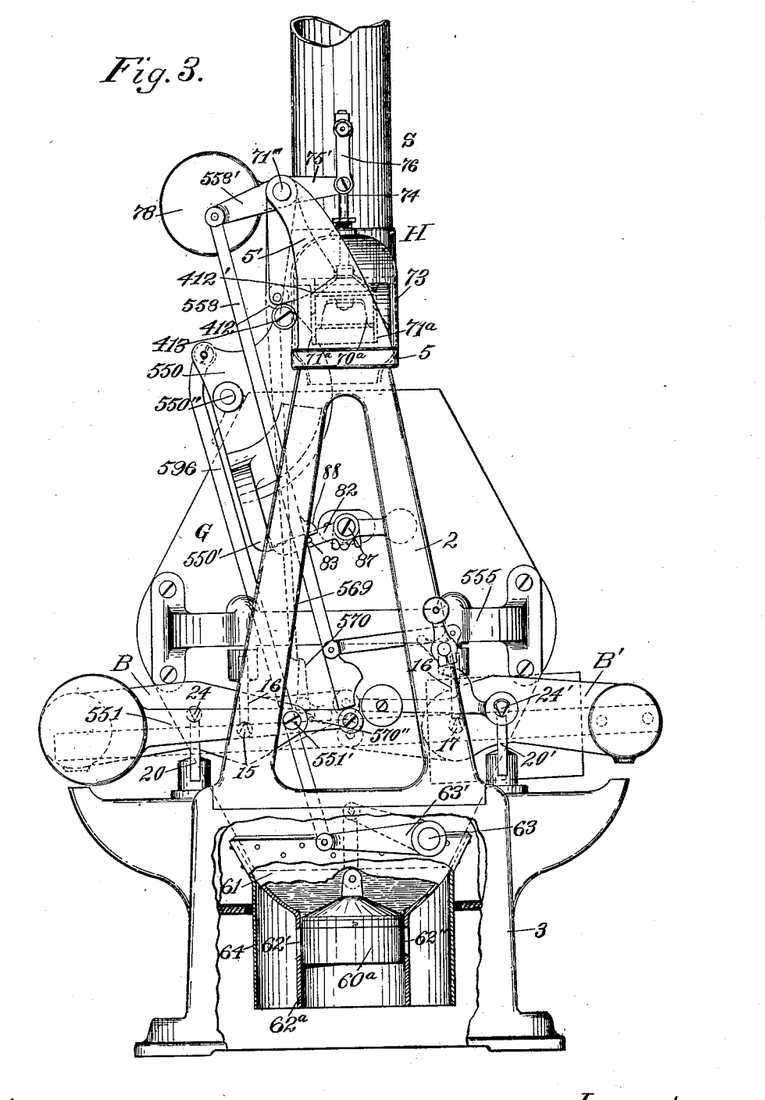
Fig. 3 is a similar view showing stream-controlling valves in the "drip" position thereof and just before the release of the bucket-discharge valves to discharge the bucket-load.

Briefly described, the operation of a machine embodying my present improvements is as follows: The normal position of the machine is that in which the full supply stream or streams flow into the bucket and the bucket-discharge valves 60 are in the closed position thereof, as shown in Fig. 2. It will be assumed that a fluid has just commenced to flow into the bucket. When a sufficient quantity of material has been received by the bucket, it tends to slowly descend. As the bucket descends the valve-opening actuator 551 will descend with the beam mechanism and will oscillate on its pivot 551', thereby permitting the closure of the stream-controlling valves 70 by the valve-closing actuator 78. The valve-closing actuator 78 tends to rotate the rock or valve-supporting shaft 71''', and as this rock-shaft rotates, the valves 70 will be raised through the toggle-connections, which are, respectively, connected with the valve-shaft 71''' and with the valves 70. As the bucket descends the stop-face 412' will ride over the stop 413 of the rocker 550, thereby compensating for the descending movement of the bucket. At the commencement of the poising period the stream-controlling valves 70ª, 70ᵇ, and 70ᶜ, which move in unison, will have cut off their respective streams. A drip-stream will continue to flow from the ports 72 in the conduit 72ᵈ. At the commencement of the poising period the arm 569 will be brought into engagement with the stop 570 on the beam B, thereby holding the valve 70ᵈ against closing movement. When the bucket has reached and gone below the poising-line, the stop 570, carried by the beam B, will release the arm 569, which will permit a quick closure of the valve 70ᵈ for cutting off its stream. The connecting-rod 596, which constitutes, alternately, a valve-movement stop and a part of the valve-opening mechanism, will also have a descending movement with the beam mechanism, and when the close of the poising period has been reached (see Fig. 3) the latch-actuator or releaser device 88 will be brought into contact with the arm 83 on the latch 82, thereby tripping said latch and releasing the latch and rocker detents 81 and 550'. As soon as these detents are released (see Fig. 4) the bucket-discharge valves 60 will be free to open, and the weight of the fluid supported by said valves will be sufficient to quickly open said valves 60. When the valves 60 are released and opened, the rocker 550 will be quickly rotated on its pivot 550''. When the rocker is so released, the stop-face 413'' will be effective for imparting to the stop 412 an additional valve-closing movement, and when said stop-face 413'' has reached the limits of its movement it will be in positive engagement with the stop 412 to thereby prevent an opening movement of the stream-controlling valves 70 while the bucket-discharge valves 60 are open.

Having thus described my invention, I claim—

1. In a weighing-machine, the combination with a bucket having a discharge-valve, of a chamber having a series of tubular conduits provided with a port or ports in the walls thereof; stream-controlling piston-valves, each operative in said conduits, one of said valves having a closing movement succeeding that of the other valve; and limiting means operative for reciprocally limiting the movements of one of the stream-controlling valves and the bucket-discharge valve.

2. In a weighing-machine, the combination with a bucket; of a fluid-chamber having a supply-conduit provided with a supply port or ports; a stream-controlling valve operative in said conduit, and adapted for alternately closing and unclosing said port or ports, to thereby prevent and permit, respectively the flow of a stream of material into the bucket; means for actuating the valves; and a scatter-guard projecting around said conduit, and adapted for preventing escape of the fluid during the flow of a stream thereof into the bucket, substantially as specified.

3. In a weighing-machine, the combination with a bucket; of a fluid-chamber having supply-conduits, each provided with a supply port or ports; stream-controlling piston-valves operative in said conduits, and each adapted for alternately closing and unclosing said ports, to thereby prevent and permit a flow of a supply-stream, and one of said valves having a cut-off movement succeeding that of one or more of the other of said stream-controlling valves, substantially as specified.

4. In a weighing-machine, the combination with a bucket; of a fluid-chamber having supply-stream conduits; supply-stream-controlling valves operative in said conduits, and each adapted for controlling a stream of material, and each of said valves having a stem, and one of said valves having a stem longer than that of the other of said valves; a valve-shaft in position and adapted for carrying said valves, and operatively connected with each of the valve-stems; and means for rocking said shaft to close the valves, whereby one or more of said valves may be effective each for simultaneously cutting off a stream of fluid, and whereby the long-stemmed valve will have a cut-off movement succeeding that of the other of said valves, substantially as specified.

5. In a weighing-machine, the combination with a bucket; of a fluid-chamber having supply-stream conduits; stream-controlling valves operative in said conduits, and each adapted for controlling a stream of material, and having one of said valves constituting a drip-valve; a valve-shaft in position and adapted for carrying said valves; means for rotating said shaft to thereby close the valves; and a depending arm carried by the valve-carrying shaft, and operable in unison with said drip-valve; a stop carried by the poising portion of the machine, and adapted for engaging the depending arm at the commencement of the poising period to hold the drip-valve against closing movement, and adapted to release said depending arm, at the close of the poising period to thereby permit a closing movement of said valve, substantially as specified.

6. In a weighing-machine, the combination with a bucket; of a casing carried by and at the discharge end of the bucket, said casing having a discharge-conduit; a bucket-discharge piston-valve operative in said conduit; means in position and adapted for normally holding said valve against opening movement; and a releaser device in position and adapted for releasing said holding means and thereby the valve, whereby when said valve is released, the pressure of the valve-sustained fluid will be effective to open said valve to discharge a stream of fluid, substantially as specified.

7. In a weighing-machine, the combination with a bucket; of a casing carried at the discharge end of the bucket, said casing having a discharge-conduit; a bucket-discharge valve operative in said conduit; means in position and adapted normally for holding said valve against opening movement; a releaser device in position and adapted for releasing said holding means and thereby the valve, whereby when said valve is released, the pressure of the valve-sustained fluid will be effective to open said valve to discharge the stream of fluid; and a second casing carried by said first-mentioned casing, and extending around said discharge-conduit, constituting a scatter-guard, and adapted for preventing the escape of fluid discharged by the bucket, substantially as specified.

8. In a weighing-machine, the combination with a bucket; of a fluid-chamber having a series of stream-conduits; a series of piston-valves reciprocative therein, and one of said valves constituting a drip-valve and having a closing movement succeeding that of the others; a series of bucket-discharge valves for controlling the discharge of the bucket-load; holding means for maintaining the bucket-discharge valves in a closed position; and a releaser device operative at a point succeeding the cut-off of the stream by the drip-valve, substantially as specified.

9. In a weighing-machine, the combination with a bucket; of a fluid-chamber having a series of stream-conduits provided with a port or ports; a series of reciprocative, piston-valves operative in said conduits, for closing and unclosing said ports; a valve-carrying shaft for said valves; a depending rod carried by said shaft; and a valve-opening actuator positioned for imparting a thrust to said depending rod, whereby said shaft will be rocked and the valves opened, substantially as specified.

10. In a weighing-machine, the combination with a bucket having a series of tubular bucket-discharge conduits at the discharge end thereof, and having said conduits provided with ports for each discharging a stream of fluid; of a series of bucket-discharge valves each operative in said discharge-conduits, and having reciprocatory sliding movements for alternately closing and unclosing said ports; a shaft in position and adapted for carrying said bucket-discharge valves; means in position and adapted for holding the shaft against rocking movement to thereby maintain said valves in the port-closing position thereof; and a releaser device in position and adapted for releasing said holding means and thereby the rock-shaft, whereby the valves will also be released to permit an unclosing of the ports in the discharge-conduits, substantially as specified.

11. In a weighing-machine, the combination with a bucket having a series of tubular discharge-conduits at the discharge end thereof, and having ports therein for discharging a stream of fluid; a series of bucket-discharge piston-valves operative in said bucket-discharge conduits, and each having a sliding movement in said conduits for alternately closing and unclosing the ports in the conduits; a rock-shaft in position and adapted for carrying said valves; connections connecting the stems of the piston-valves and the rock-shaft, respectively, holding means in position and adapted for normally holding said rock-shaft against rocking movement; and a releaser device in position and adapted for releasing said holding means, to thereby permit a rocking movement of said rock-shaft, whereby the valves may be released to unclose the ports in the discharge-conduits, substantially as specified.

12. In a weighing-machine, the combination with a bucket; of a fluid-chamber having a series of tubular supply-stream conduits, each having a port or ports; a series of reciprocatory sliding piston-valves operative in said conduit, and adapted for alternately closing and unclosing said ports; a shaft in position and adapted for carrying said valves; connections respectively connecting each of the valve-stems with said shaft; means for rotating said shaft in reverse directions, to thereby open and close alternately the ports in the supply-stream conduits; and a series of discharge-conduits each having a series of discharge-ports; a series of bucket-discharge valves having reciprocatory sliding movements in the bucket-discharge conduits, and adapted for alternately closing and unclosing the ports in the discharge-conduits, and having the port-closing period of the bucket-discharge valves alternating with that of the port-closing period of the stream-controlling valves, substantially as specified.

13. In a weighing-machine, the combination with a beam mechanism; of a bucket supported thereby; a series of stream-supply conduits having ports therein; a series of valves operative therein for reciprocatory sliding movement to alternately close and unclose the ports in said conduits; a valve-carrying shaft; a counterweighted arm carried by said shaft, and constituting a valve-closing actuator; a connecting-rod depending from said shaft; a counterweighted lever carried by the beam mechanism, and adapted at a predetermined point to transmit to said connecting-rod a valve-opening thrust; a series of bucket-discharge conduits; a series of reciprocatory sliding valves operative therein, and each adapted for controlling the discharge of a stream of material; and means for releasing the bucket-discharge valves to thereby discharge the bucket-load on the final cut-off movement of the valve mechanism, substantially as specified.

FRANCIS H. RICHARDS.

Witnesses:
FRED. J. DOLE,
R. W. PITTMAN.